US010663607B2

(12) United States Patent
Zhang et al.

(10) Patent No.: US 10,663,607 B2
(45) Date of Patent: May 26, 2020

(54) APPARATUSES FOR PROCESSING SIGNALS FOR A PLURALITY OF ENERGY REGIONS, AND SYSTEMS AND METHODS FOR DETECTING RADIATION OF A PLURALITY OF ENERGY REGIONS

(71) Applicant: Nuctech Company Limited, Beijing (CN)

(72) Inventors: Lan Zhang, Beijing (CN); Yingshuai Du, Beijing (CN); Bo Li, Beijing (CN); Zonggui Wu, Beijing (CN); Jun Li, Beijing (CN); Xuepeng Cao, Beijing (CN); Haifan Hu, Beijing (CN); Jianping Gu, Beijing (CN); Guangming Xu, Beijing (CN); Bicheng Liu, Beijing (CN)

(73) Assignee: Nuctech Company Limited, Beijing (CN)

( * ) Notice: Subject to any disclaimer, the term of this patent is extended or adjusted under 35 U.S.C. 154(b) by 121 days.

(21) Appl. No.: 15/591,165

(22) Filed: May 10, 2017

(65) Prior Publication Data

US 2018/0059269 A1 Mar. 1, 2018

(30) Foreign Application Priority Data

Aug. 31, 2016 (CN) .......................... 2016 1 0798762

(51) Int. Cl.
*G01T 1/36* (2006.01)
(52) U.S. Cl.
CPC ................ *G01T 1/366* (2013.01); *G01T 1/36* (2013.01)
(58) Field of Classification Search
None
See application file for complete search history.

(56) References Cited

U.S. PATENT DOCUMENTS 3,270,205 A 8/1966 Ladd et al.
3,483,467 A * 12/1969 Bates, Jr. ............... G01R 27/28
324/615

(Continued)

FOREIGN PATENT DOCUMENTS

CN 101937096 A 1/2011
CN 103226204 A 7/2013
(Continued)

OTHER PUBLICATIONS

"European Application Serial No. 17170614.6, Extended European Search Report dated Nov. 21, 2017", (Nov. 21, 2017), 6 pgs.

(Continued)

*Primary Examiner* — David M. Gray
*Assistant Examiner* — Geoffrey T Evans
(74) *Attorney, Agent, or Firm* — Schwegman Lundberg & Woessner, P.A.

(57) ABSTRACT

The present disclosure provides an apparatus for processing signals for a plurality of energy regions, and a system and method for detecting radiation of a plurality of energy regions. The apparatus for processing signals for a plurality of energy regions may comprise: a first processor, configured to receive a signal from a detector and process the received signal to generate a gated signal, wherein a turn-on period of the gated signal represents magnitude of the received signal; and a second processor, configured to receive the gated signal from the first processor, and determine one of the plurality of energy regions to which the received signal belongs according to the turn-on period of the gated signal, so as to count signals within the determined energy region.

9 Claims, 3 Drawing Sheets

(56) References Cited

U.S. PATENT DOCUMENTS

| | | | |
|---|---|---|---|
| 3,634,688 A | 1/1972 | Di Rocco | |
| 2002/0121993 A1* | 9/2002 | Velazquez | H03M 1/1052 341/118 |
| 2009/0039271 A1* | 2/2009 | Farsoni | G01T 1/202 250/367 |
| 2010/0025589 A1* | 2/2010 | Olcott | G01T 1/1647 250/363.03 |

FOREIGN PATENT DOCUMENTS

| | | |
|---|---|---|
| CN | 105301627 A | 2/2016 |
| CN | 105700005 A | 6/2016 |

OTHER PUBLICATIONS

"Chinese Application Serial No. 201610798762.X, Office Action dated Feb. 15, 2019", (Feb. 15, 2019), 8 pgs.

King, Ling, et al., "Design of Multi-channel Analyzer Based on FPGA", China Academic Journal Electronic Publishing House, (2018), 66-69.

Lou, Xinghua, et al., "A novel portable multi-channel analyzer based on high-speed microcontroller", Nuclear Electronics and Detection Technology 25.5, (2005), 532-535.

* cited by examiner

Apparatus for processing signals
for a plurality of energy regions 30

APPARATUSES FOR PROCESSING SIGNALS FOR A PLURALITY OF ENERGY REGIONS, AND SYSTEMS AND METHODS FOR DETECTING RADIATION OF A PLURALITY OF ENERGY REGIONS

CROSS-REFERENCE TO RELATED APPLICATION(S)

This application claims priority to the Chinese Patent Application No. 201610798762.X, filed on Aug. 31, 2016, entitled "APPARATUSES FOR PROCESSING SIGNALS FOR A PLURALITY OF ENERGY REGIONS, AND SYSTEMS AND METHODS FOR DETECTING RADIATION OF A PLURALITY OF ENERGY REGIONS" which is incorporated herein by reference in its entirety.

TECHNICAL FIELD

The present disclosure relates to the field of radiation imaging, and in particular, to apparatuses for processing signals for a plurality of energy regions, and systems and methods for detecting radiation of a plurality of energy regions.

BACKGROUND

Imaging detection apparatuses using X-ray imaging technologies are known to people. For example, in subways, airports and bus stations, personal bags and other items of passengers are detected by using the apparatuses, so as to check whether there are illegal transport articles such as radiation sources, explosives, drugs etc. At present, the threat of terrorist organization is serious, and thus the accuracy for identifying materials in the imaging detection apparatuses is very important.

In recent years, with the development of semiconductor technology, semiconductor detectors at room temperature have been used in many fields, such as nuclear physics, X-ray detection, gamma ray detection, astronomical detection, environmental monitoring, medical imaging etc. In particular, cadmium zinc telluride (CdZnTe, CZT for short) is considered to be the most promising radiation detection material due to its advantages such as excellent energy resolution, high detection efficiency and the ability to work at room temperature.

Compared with integral and indirect type radiation detectors, photon counting imaging using CZT semiconductor detectors has higher detection efficiency, a higher signal-to-noise ratio and a higher energy resolution. Therefore, it is possible to display images for a plurality of energy regions, and to identify materials by using information on the plurality of energy regions. Currently, imaging detection apparatuses for a plurality of energy regions have been proposed, and different divisions of energy regions can be applied to image display and material identification. In particular, the divisions of the energy regions may include equal energy region division, fine energy region division, optimized energy region division etc.

One way to implement a conventional system for detecting radiation of a plurality of energy regions is shown in FIG. 1. Specifically, in the system for detecting radiation of a plurality of energy regions shown in FIG. 1, a method of combining threshold devices and counters is employed. After rays as a detected object interact with the detector, electrons and holes are generated, Due to an electric field formed by the electrons and holes, signals are generated at anodes and cathodes of the detector, respectively. The signal is amplified, filtered and shaped to be transferred to a detection channel consisting of a plurality of threshold devices and a plurality of counters. Specifically, if amplitude of the signal is greater than a threshold set by the threshold device, a count value of the counter is added with 1. Therefore, the count value of the corresponding energy region can be obtained by setting different thresholds. In other words, by increasing a number of threshold devices and a number of counters, count values of more energy regions can be obtained. However, the drawback of this method is that the ASIC design is complex, and the combination of the threshold devices and the counters not only brings more power consumption, but also increases the noise of the system. Therefore, it cannot detect more energy regions in practice.

In order to achieve detection of more energy regions, a radiation detection system shown in FIG. 2 has been developed. This method can implement detection of multiple energy regions by adding an Analog Digital Converter (ADC) to each single channel or multiplexing one ADC among multiple channels. Specifically, in the system shown in FIG. 2, a detection signal is delivered to an ADC after being preprocessed, and then is processed by the ADC and transmitted to a FPGA to arrive at a computer, wherein the preprocessing may comprise performing processes on the detection signal, such as pre-amplification, filtering and shaping etc. By using the ADC, this method can detect more energy regions with its energy resolution being related to ADC accuracy. However, it should be noted that although FIG. 2 only shows a single channel of a conventional system for detecting radiation of a plurality of energy regions, the radiation detection system may include multiple channels. It should be also noted that although this method is simple, the implementation may occur many problems. In particular, in the radiation detection system, a plurality of ADCs are needed due to a large number of channels, and as a speed of the signal is high, requirements for the speed of the ADC is also relatively high, causing a high cost of the radiation detection system. In addition, in the circuit design, due to the addition of a plurality of ADCs, the FPGA needs more ports, which not only increases the overall power consumption of the system, but also makes the circuit design of the system more complex in practice and brings more uncertainty, and thereby the system has a poor practicability.

Therefore, there is a need to provide an apparatus for processing signals for a plurality of energy regions, and a system and method for detecting radiation of a plurality of energy regions, which can separate the analog circuit from the digital circuit, improve the energy resolution of the system, and simplify the design of the system.

SUMMARY

In order to solve at least one of the above problems, the present disclosure provides an apparatus for processing signals for a plurality of energy regions, and a system and method for detecting radiation of a plurality of energy regions, which can separate the analog circuit from the digital circuit, improve the energy resolution of the system, and simplify the design of the system.

According to an aspect of the present disclosure, there is provided an apparatus for processing signals for a plurality of energy regions, comprising: a first processor, configured to receive a signal from a detector and process the received signal to generate a gated signal, wherein a turn-on period of the gated signal represents magnitude of the received signal;

and a second processor, configured to receive the gated signal from the first processor, and determine one of the plurality of energy regions to which the received signal belongs according to the turn-on period of the gated signal, so as to count signals within the determined energy region.

Preferably, the first processor is further configured to: find a peak of the received signal; attenuate the received signal from the peak according to a predetermined attenuation scheme; and turn on the gated signal in response to the amplitude of the received signal reaching the peak, and turn off the gated signal n response to the received signal being attenuated to a predetermined threshold.

Preferably, the first processor is implemented with an Application Specific Integrated Circuit (ASIC).

Preferably, the second processor further comprises: a clock, configured to generate a clock signal; a counter, configured to receive the gated signal from the first processor, and count the gated signal according to a frequency of the clock signal within the turn-on period of the gated signal to obtain a count value, wherein one of the plurality of energy regions to which the received signal belongs is determined by the count value; and a plurality of energy region registers corresponding to the plurality of energy regions respectively and connected with the counter, and configured to add a register value of a respective energy region register corresponding to an energy region determined according to the count value with 1.

Preferably, the second processor is implemented with a Field Programmable Gate Array (FPGA).

Preferably, the predetermined attenuation scheme comprises a scheme of attenuating the received signal linearly according to a specified linearity.

Preferably, the predetermined attenuation scheme comprises a scheme of attenuating the received signal exponentially, and the first processor is further configured to modify the generated gated signal.

Preferably, the first processor further comprises an amplifier and/or a filter and a shaper.

According to another aspect of the present disclosure, there is provided a system for detecting radiation of a plurality of energy regions, comprising: a detector, configured to receive rays transmitted through a detected object and generate a signal according to the received rays; and an apparatus for processing signals for the plurality of energy regions, comprising: a first processor, configured to receive the signal from the detector and process the received signal to generate a gated signal, wherein a turn-on period of the gated signal represents magnitude of the received signal; and a second processor, configured to receive the gated signal from the first processor, and determine one of the plurality of energy regions to which the received signal belongs according to the turn-on period of the gated signal, so as to count signals within the determined energy region.

According to another aspect of the present disclosure, there is provided a method for detecting radiation of a plurality of energy regions, comprising: receiving a signal; processing the received signal to generate a gated signal, wherein a turn-on period of the gated signal represents magnitude of the received signal; and determining one of the plurality of energy regions to which the received signal belongs according to the turn-on period of the gated signal, so as to count signals within the determined energy region.

BRIEF DESCRIPTION OF THE DRAWINGS

The above and other aspects, features and advantages of exemplary embodiments of the present disclosure will become more apparent from the following description taken in conjunction with the accompanying drawings in which.

DETAILED DESCRIPTION

Exemplary embodiments of the present disclosure are described below with reference to the accompanying drawings. The present disclosure provides an apparatus for processing signals for a plurality of energy regions, and a system and method for detecting radiation of a plurality of energy regions, which can separate the analog circuit from the digital circuit, improve the energy resolution of the system, and simplify the design of the system.

It should be understood that, although CZT detectors which are capable of operating at room temperature and have a high energy resolution and detection efficiency are used in the following description, the present disclosure is not limited to CZT detectors, and other detectors such as Cadmium Manganese Telluride (CdMnTe), Mercuric Iodide (HgI2), Thallium Bromide (TIBr), Lead Iodide (PbI2), Gallium Arsenide (GaAs), Germanium (Ge) may also be used.

In addition, it should be noted that although in the embodiments of the present disclosure, multiple energy regions are implemented based on an article recognition system, the present disclosure is not limited thereto. The inventive concept of the present disclosure can be also applied to fields such as industrial Computed Tomography (CT), medical imaging, dental CT etc.

Therefore, the present disclosure is directed to provide an apparatus for processing signals for a plurality of energy regions, and a system and method for detecting radiation of a plurality of energy regions, which can separate the analog circuit from the digital circuit, improve the energy resolution of the system, and simplify the design of the system.

Figure 1:
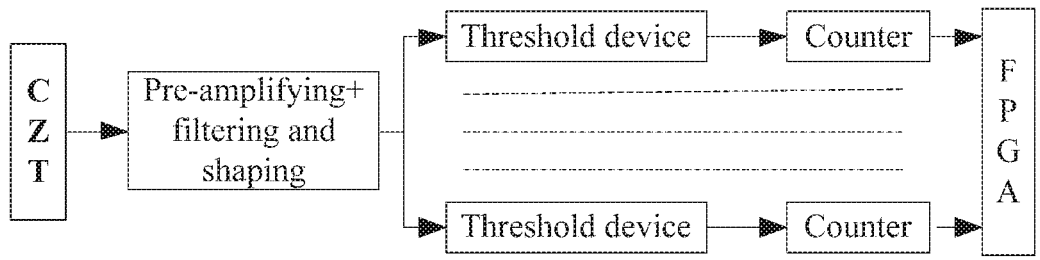
FIG. 1 shows an implementation of a conventional system for detecting radiation of a plurality of energy regions.
Figure 2:
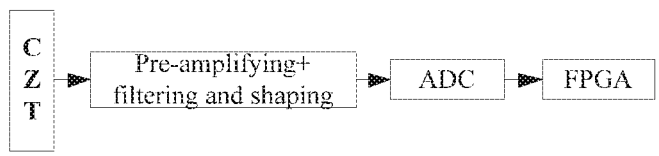
FIG. 2 shows another implementation of a conventional system for detecting radiation of a plurality of energy regions.
Figure 3:
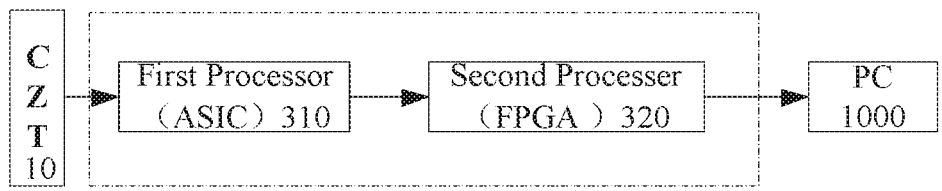
FIG. 3 shows a structural diagram of a system for detecting radiation of a plurality of energy regions according to an exemplary embodiment of the present disclosure.

In particular, FIG. 3 shows a structural diagram of a system for detecting radiation of a plurality of energy regions according to an exemplary embodiment of the present disclosure. As shown in FIG. 3, the system for detecting radiation of a plurality of energy regions according to an exemplary embodiment of the present disclosure may comprise a detector 10 (with a CZT as an example in the figure) and an apparatus 30 for processing signals for a plurality of energy regions. In particular, the detector 10 may be configured to receive rays transmitted through a detected object and generate a signal according to the received rays, and the apparatus 30 for processing signals for a plurality of energy regions may comprise a first processor 310 and a second processor 320. More specifically, the first processor 310 may be configured to receive a signal from a detector and process the received signal to generate a gated signal, wherein a turn-on period of the gated signal represents magnitude of the received signal. For example, the first processor 310 may be implemented with an Application Specific Integrated Circuit (ASIC) module. The second processor 320 may be configured to receive the gated signal from the first processor, and determine one of the plurality of energy regions to which the received signal belongs according to the turn-on period of the gated signal, so as to count signals within the determined energy region. For example, the second processor 320 may be implemented with a Field Programmable Gate Array (FPGA) module. Those skilled in the art should recognize that although the exemplary embodiment of the present disclosure is described with the first processor 310 being implemented with the ASIC module and the second processor 320 being implemented with the FPGA module in the present disclosure, the present disclosure is not limited thereto. The first processor 310 and the second processor 320 may also be implemented with other processing modules which are available or may be developed in the future.

According to an exemplary embodiment of the present disclosure, detection of radiation of a plurality of energy regions is achieved by using a combination of ASIC and FPGA modules. In the illustrated structure, a new ASIC design structure is used which can reduce the difficulty for designing ASICs. Thus, a system for detecting radiation of a plurality of energy regions can be achieved with a simple circuit. In particular, a detection signal from the CZT 10 may be transmitted to the ASIC module 310, wherein the ASIC module 310 is configured to receive the detection signal and process the received signal to generate a gated signal. The processing may comprise performing amplifying, filtering and shaping, peak finding, and/or linear attenuating processes on the signal, and then the gated signal is generated according to the processed signal. In addition, a turn-on period of the generated gated signal may represent magnitude of the received signal. Subsequently, the signal processed by the ASIC module 310 may be delivered to the FPGA module 320, wherein the FPGA module 320 is configured to determine one of the plurality of energy regions corresponding to the received signal according to the turn-on period of the gated signal, so as to count signals within the determined energy region. In designing the overall system, it should be ensured that there is no digital signal within the first processor 310 and the processing of the digital signal is completed in the second processor 320, thereby avoiding additional noises caused by introduction of digital components such as clocks, counter converters etc.

Figure 4:
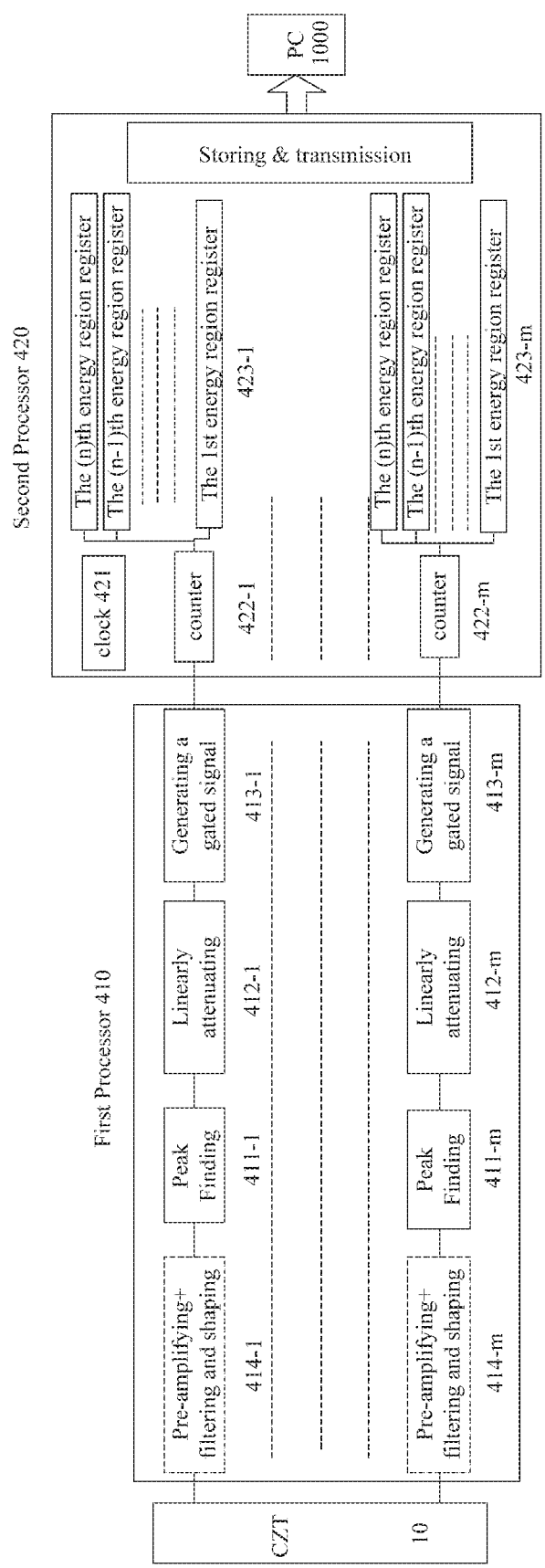
FIG. 4 shows a detailed structural diagram of an apparatus for processing signals for a plurality of energy regions according to an exemplary embodiment of the present disclosure.

A detailed structural diagram of the apparatus for processing signals for a plurality of energy regions according to an exemplary embodiment of the present disclosure will be described below with reference to FIG. 4. Specifically, as shown in FIG. 4, the apparatus for processing signals for a plurality of energy regions according to an exemplary embodiment of the present disclosure may comprise a first processor 410 and a second processor 420. The functions of the first processor and the second processor have been described with reference to FIG. 3, and will not be repeated below. An embodiment of the apparatus for processing signals for a plurality of energy regions according to the present disclosure will be described below with reference to FIG. 4.

In particular, in the embodiment shown in FIG. 4, the first processor 410 within a single channel may comprise a peak finding unit 411 configured to perform a peak finding process on the signal received from the detector to find a peak of the received signal; an attenuation unit 412 configured to attenuate the received signal from the peak according to a predetermined attenuation scheme and a result of the peak finding process; and a gated signal generation unit 413 configured to generate a gated signal according to the attenuated signal and a predetermined threshold, wherein the gated signal is turned on in response to amplitude of the received signal reaching the peak, and is turned off in response to the received signal being attenuated to the predetermined threshold. Alternatively, the turn-on period of the gated signal is proportional to the magnitude of the detection signal received from the detector. In addition, the first processor 410 may further comprise a preprocessing module 414, wherein the preprocessing module 414 may preprocess the received detection signal, for example, amplify and/or filter and shape the received detection signal. In other words, the preprocessing module 414 may comprise an amplifier and/or a filter and a shaper. In addition, the predetermined attenuation scheme may comprise a scheme of attenuating the received signal linearly according to a specified linearity and a scheme of attenuating the received signal exponentially. When the predetermined attenuation scheme is an exponential attenuation scheme, the gated signal generation unit 413 is further configured to modify the generated gated signal, so that the turn-on period of the gated signal is proportional to the magnitude of the detection signal received from the detector.

In addition, according to the present exemplary embodiment, the second processor 420 may comprise: a clock 421, configured to generate a clock signal; a counter 422, configured to receive the gated signal from the first processor 410, and count the gated signal according to a frequency of the clock signal within the turn-on period of the gated signal to obtain a count value, wherein one of the plurality of energy regions to which the received signal belongs is determined by the count value; and a plurality of energy region registers 423, connected with the counter 422, and configured to add a register value of a respective energy region register corresponding to an energy region determined according to the count value with 1, so as to count signals within the determined energy region. Finally, the count value is stored in each energy region register and output to a user. In one embodiment, the count value stored in each energy region register represents a count value of the energy region corresponding to the energy region register, and a number of energy regions is the same as a number of energy region registers. In an embodiment where a linear attenuation scheme is applied, the turn-on period of the gated signal is proportional to the magnitude of the detection signal received from the detector, and the resolution of the system is proportional to the frequency of the clock. In this case, the number N of energy regions in the system can be calculated as follows:

$$N=T*F,$$

wherein F is the clock frequency; and T is an attenuation time of the maximum signal. That is, if the attenuation time T of the maximum signal is 500 ns and the clock frequency F is 100M, the number of the energy regions N is 50.

A detailed embodiment of the apparatus for processing signals for a plurality of energy regions according to the present disclosure is described above with reference to FIG. 4. However, it is to be understood that the apparatus for processing signals for a plurality of energy regions according to the present disclosure is not limited to the above-described implementation, and the first processor and the second processor may be implemented in other ways, as long as the first processor can generate a gate signal, of which a turn-on period indicates amplitude of the received signal, according to the received signal, and the second processor may determine one of the plurality of energy regions to which the detection signal transmitted from a detected object belongs according to the turn-on period of the generated gated signal, so as to count signals within the determined energy region.

Figure 5:
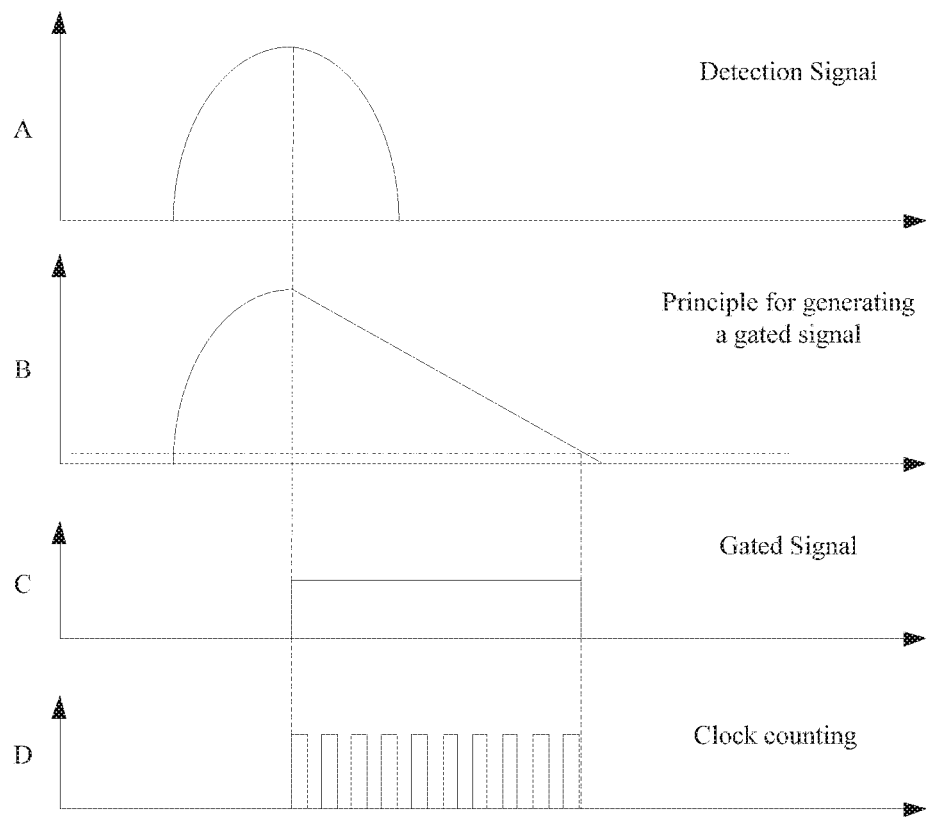
FIG. 5 shows a waveform diagram of a system for detecting radiation of a plurality of energy regions according to an exemplary embodiment of the present disclosure.

The principle of a method for detecting radiation of a plurality of energy regions according to an exemplary embodiment of the present disclosure will be described below with reference to FIG. 5. FIG. 5 exemplarily illustrates a signal waveform diagram of the system for detecting radiation of a plurality of energy regions using a linear attenuation scheme.

Specifically, it is assumed that the first processor of the apparatus for processing signals for a plurality of energy regions is implemented with an ASIC module and the second processor is implemented with a FPGA module. FIG. 5 shows a principle for an implementation with a single channel and a plurality of energy regions. FIG. 5A shows a pulse waveform diagram of a signal in the ASIC module; FIG. 5B shows a waveform diagram of the signal after being attenuated according to a specified linearity in response to the pulse reaching the peak; and FIG. 5C shows a waveform diagram of the gated signal which is generated from the above-mentioned detection signal, wherein the gated signal is turned on in response to amplitude of the received signal reaching the peak, and is turned off in response to the received signal being attenuated to the predetermined threshold; and FIG. 5D shows a process of the counter counting the gated signal according to a frequency of the clock signal within the turn-on period of the gated signal to obtain a count value, where the count value represents an energy region value. In response to the counter completing the counting during the turn-on period of the gated signal, i.e. when the current counting is completed or the energy region to which the received signal belongs is determined, a register value of a respective energy region register corresponding to the energy region determined according to the count value of the counter is added with 1.

Thus, in this exemplary embodiment, amplitude-to-time conversion is achieved by the first processor, and then numbers of signals within different energy regions are obtained by the second processor. The detection signal transmitted from the detected object is firstly converted by the detector and then amplified and/or shaped by circuits. After finding the peak of the signal, the ASIC module may turn on a gated signal and attenuate the signal from the peak of the signal according to a specified linearity at the same time, and the ASIC module may turn off the gated signal when the signal is below a set threshold. During the turn-on period of the gated signal, the counter starts counting according to the clock frequency to obtain a count value. The count value within the time of the gated signal may indicate a serial number of the energy region. Thus, the value of the energy region register corresponding to the indicated energy region may be added with 1, to achieve counting of the plurality of energy regions. By using the above solutions, the present disclosure may simply the design of the ASIC module, and reduce excessive demands on components of the system, thereby simplifying the design of PCB circuits and improving the signal to noise ratio of the system.

The above implementation is merely a specific implementation of the inventive concept, and the invention is not limited to the above-described implementations. It is possible to omit or skip some processes in the above-described implementations without departing from the spirit and scope of the present disclosure.

The foregoing method may be implemented in a form of a executable program commands which can be recorded in a computer readable recording medium and implemented by a variety of computer apparatuses. In this case, the computer-readable recording medium may include a separate program command, a data file, a data structure, or a combination thereof. At the same time, the program commands recorded in the recording medium may be specifically designed or configured for use in the present disclosure, or be well known by a person skilled in the art of computer software. The computer-readable recording medium may comprise a magnetic medium such as a hard disk, a floppy disk or a magnetic tape, an optical medium such as a compact disc read-only memory (CD-ROM) or a digital versatile disk (DVD), a magneto-optical medium such as a magneto-optical floppy disk, and hardware such as ROM, RAM and FLASH which may store and implement the program commands. In addition, the program commands may comprise machine language codes formed by compilers and executable high-level language which is executable by using an interpreter via computers. The preceding hardware device may be configured to operate as at least one software module to perform the operations of the present disclosure, and vice versa.

Although the operation of the method of the present method is shown and described in a particular order, it is possible to change the order of operations of each method, such that a particular operation may be performed in reverse order or such that a particular operation may be performed at least partially with other operations. Furthermore, the invention is not limited to the example embodiments described above, and may include one or more other components or operations, or omit one or more other components or operations without departing from the spirit and scope of the present disclosure.

While the present disclosure has been shown in connection with the preferred embodiments of the present disclosure, it will be understood by those skilled in the art that various modifications, substitutions and alterations can be made therein without departing from the spirit and scope of the invention. Accordingly, the invention should not be limited by the above-described embodiments, but should be defined by the appended claims and their equivalents.

We claim:

1. An apparatus for processing signals for a plurality of energy regions, comprising:
    a first processor, configured to receive a signal from a detector and process the received signal to generate a gated signal, wherein a turn-on period of the gated signal represents magnitude of the received signal; and
    a second processor, configured to receive the gated signal from the first processor, and determine one of the plurality of energy regions to which the received signal belongs according to the turn-on period of the gated signal, so as to count signals within the determined energy region,
    wherein the first processor is further configured to: turn on the gated signal while it is found that the amplitude of the received signal reaches a peak; and attenuate the received signal from the peak according to a predetermined attenuation scheme, and turn off the gated signal while the received signal is attenuated to a predetermined threshold.

2. The apparatus of claim 1, wherein the first processor is implemented with a Application Specific Integrated Circuit (ASIC).

3. The apparatus of claim 1, wherein the second processor further comprises:
a clock, configured to generate a clock signal;
a counter, configured to receive the gated signal from the first processor, and count the gated signal according to a frequency of the clock signal within the turn-on period of the gated signal to obtain a count value, wherein one of the plurality of energy regions to which the received signal belongs is determined by the count value; and
a plurality of energy region registers corresponding to the plurality of energy regions respectively and connected with the counter, and configured to add a register value of a respective energy region register corresponding to an energy region determined according to the count value with 1.

4. The apparatus of claim 1, wherein the second processor is implemented with a Field Programmable Gate Array (FPGA).

5. The apparatus of claim 1, wherein the predetermined attenuation scheme comprises a scheme of attenuating the received signal linearly according to a specified linearity.

6. The apparatus of claim 1, wherein the predetermined attenuation scheme comprises a scheme of attenuating the received signal exponentially, and the first processor is further configured to modify the generated gated signal.

7. The apparatus of claim 1, wherein the first processor further comprises an amplifier and/or a filter and a shaper.

8. A system for detecting radiation of a plurality of energy regions, comprising:
a detector, configured to receive rays transmitted through a detected object and generate a signal according to the received rays; and
an apparatus for processing signals for the plurality of energy regions, comprising:
a first processor; configured to receive the signal from the detector and process the received signal to generate a gated signal, wherein a turn-on period of the gated signal represents magnitude of the received signal; and
a second processor, configured to receive the gated signal from the first processor, and determine one of the plurality of energy regions to which the received signal belongs according to the turn-on period of the gated signal, so as to count signals within the determined energy region,
wherein the first processor is further configured to: turn on the gated signal while it is found that the amplitude of the received signal reaches a peak; and attenuate the received signal from the peak according to a predetermined attenuation scheme, and turn off the gated signal the received signal is attenuated to a predetermined threshold.

9. A method for detecting radiation of a plurality of energy regions, comprising:
receiving a signal;
processing the received signal to generate a gated signal; wherein a turn-on period of the gated signal represents magnitude of the received signal; and
determining one of the plurality of energy regions to which the received signal belongs according to the turn-on period of the gated signal, so as to count signals within the determined energy region,
wherein generating a gated signal comprises:
turning on the gated signal while it is found that the amplitude of the received signal reaches a peak; and attenuating the received signal from the peak according to a predetermined attenuation scheme, and turning off the gated signal while the received signal is attenuated to a predetermined threshold.

* * * * *